(No Model.)
H. P. TERRY.
SHEAVE.
No. 415,987.  Patented Nov. 26, 1889.
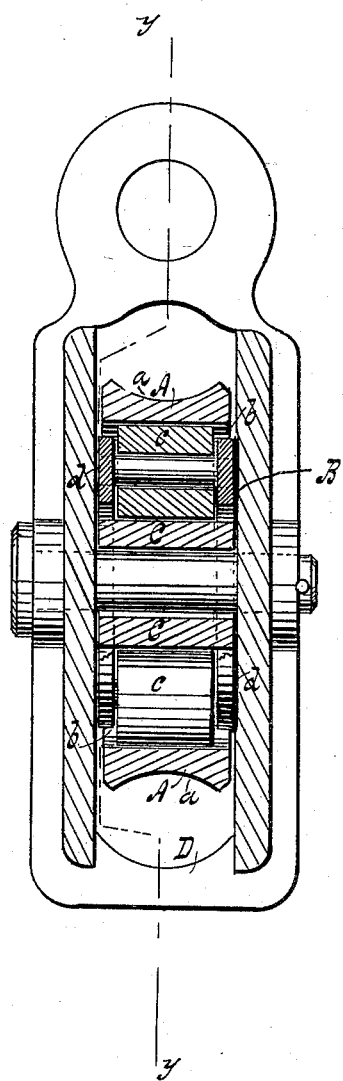
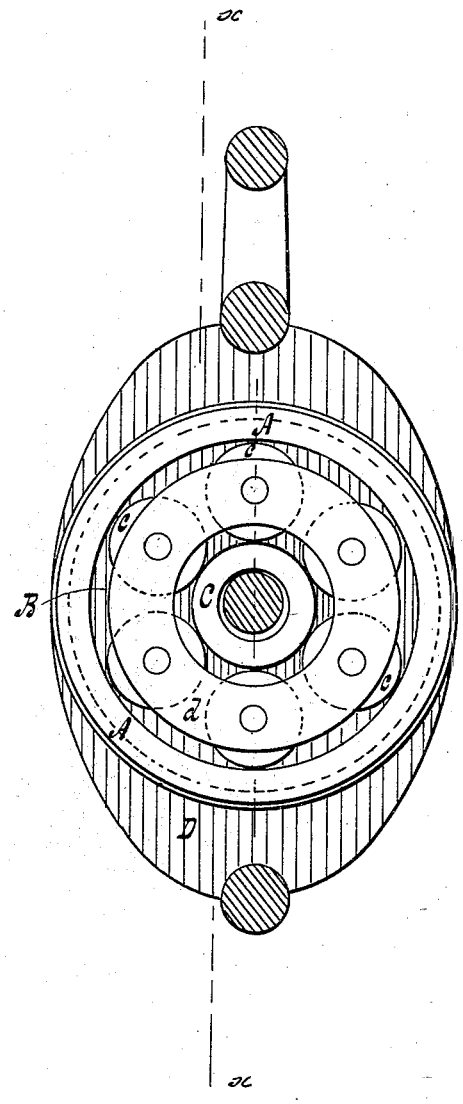
WITNESSES:
Walter Ward
W. A. Williams
INVENTOR:
Howell P. Terry,
BY G. M. Plympton,
ATTORNEY.

UNITED STATES PATENT OFFICE.

HOWELL P. TERRY, OF BROOKLYN, NEW YORK.

SHEAVE.

SPECIFICATION forming part of Letters Patent No. 415,987, dated November 26, 1889.

Application filed August 21, 1889. Serial No. 321,452. (No model.)

*To all whom it may concern:*

Be it known that I, HOWELL P. TERRY, of Brooklyn, in the county of Kings and State of New York, have invented a certain new and useful Improvement in Sheaves, of which I declare the following to be a full, clear, and exact description, reference being had to the accompanying drawings, forming part of this specification.

This invention relates to improvements in sheaves which are provided with anti-friction-roller bearings; and the invention consists of the combination, with a pulley-block or other suitable frame, of the several elements constituting the sheave hereinafter described, in the manner particularly set forth.

In the accompanying sheet of drawings, Figure 1 is an edge view, partly in section, of the sheave and the block in which the same is mounted. Fig. 2 is a side view of the sheave and vertical section of the block.

Similar letters of reference indicate like parts in the several views.

The special object of this invention is to improve the construction of sheaves designed expressly for the blocks and other portions of the rigging of ships. The improved sheave is adapted to an ordinary block, and may be substituted for a common sheave of similar dimensions, no change whatever in the block being required for that purpose.

The sheave is composed of three concentric parts, which are held in their proper relative positions on the spindle by the sides of the block, whereby the lateral movement of any of the parts is prevented, and therefore no special casing is needed to keep them together. The part A, which forms the outermost portion or rim of the sheave, consists of an annulus having the groove $a$ for the rope and the cylindrical inner surface $b$. Within the rim is the part B, which is composed of a series of rollers $c\ c$, &c., mounted on pintles between the rings $d\ d$, the rollers, rings, and pintles being permanently secured together. The rollers $c\ c$, &c., bear against the inner surface $b$ of the rim. The third part C is a roller having a hole coincident with its axis of the proper diameter to allow the spindle on which the sheave is mounted to pass freely through the rollers, and the outer surface of this roller bears against the rollers $c\ c$, &c., surrounding it. When the three parts are confined within the block, their lateral faces lie in two parallel planes, or substantially so.

D designates a block in which the sheave is mounted. If the sheave is caused to turn by the friction of a rope, for instance, passing over it, the rim travels on the rollers $c\ c$, &c., and the part B on the roller C; but the roller C, although it is not tightly fixed to the spindle, does not ordinarily turn on the spindle, except to a very limited extent, since the friction between these is greater than that of the rollers $c\ c$, &c., against the roller C and the surface $b$ of the rim. The spindle may fill or only partly fill the hole in the roller C, yet the sheave operates satisfactorily in either case, and an important advantage is due to this feature of the invention, for this sheave, since it can be used on spindles of various sizes, frequently enables worn-out or broken sheaves to be readily replaced by new ones, when this could not be conveniently done with sheaves of other kinds.

Having now described my invention, what I claim as new, and desire to secure by Letters Patent, is—

1. The combination, with the block or frame and spindle, of the roller C, loose upon the spindle, the part B, composed of the rings, pintles, and rollers $c\ c$, &c., permanently united, and the rim having the cylindrical inner surface $b$, the rollers $c\ c$, &c., bearing upon the roller C and the surface $b$ of the rim, and the roller C, the part B, and the rim being held on either side in their proper relative positions by the block or frame, substantially as shown and described.

2. The combination, with the block or frame and spindle, of the central roller C upon the spindle, the part B, composed of the rings, pintles, and rollers permanently united, and the rim A, the roller C, the part B, and the rim being held on either side in their proper relative positions solely by the block or frame, substantially as described.

HOWELL P. TERRY.

In presence of—
D. A. CARPENTER,
WALTER WARD.